(12) United States Patent
Matsunaga et al.

(10) Patent No.: US 6,843,688 B2
(45) Date of Patent: Jan. 18, 2005

(54) CONNECTOR IN WHICH MOVEMENT OF CONTACT PORTION OF CONTACT IS GUIDED BY INSULATOR

(75) Inventors: Akihiro Matsunaga, Tachikawa (JP); Keiichiro Suzuki, Kodaira (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 0 days.

(21) Appl. No.: 10/402,475

(22) Filed: Mar. 28, 2003

(65) Prior Publication Data

US 2003/0186588 A1 Oct. 2, 2003

(30) Foreign Application Priority Data

Mar. 29, 2002 (JP) ....................................... 2002/094987

(51) Int. Cl.⁷ .............................................. H01R 24/00
(52) U.S. Cl. ...................................... 439/630; 439/862
(58) Field of Search ................................ 439/630, 180, 439/862, 632, 733.1, 188

(56) References Cited

U.S. PATENT DOCUMENTS

| | | | |
|---|---|---|---|
| 5,882,230 A | * | 3/1999 | Bricaud et al. ............ 439/630 |
| 6,068,514 A | * | 5/2000 | Zuin ......................... 439/630 |
| 6,454,607 B2 | * | 9/2002 | Bricaud ..................... 439/630 |
| 6,576,853 B2 | * | 6/2003 | Motojima ................ 200/51.09 |
| 6,616,485 B2 | * | 9/2003 | Harasawa et al. .......... 439/630 |

FOREIGN PATENT DOCUMENTS

| | | |
|---|---|---|
| JP | 61-119288 U | 7/1986 |
| JP | 10-012342 | 1/1998 |
| JP | 2000-036349 | 2/2000 |
| JP | 2000-200638 | 7/2000 |
| JP | 2001-135382 | 5/2001 |

* cited by examiner

*Primary Examiner*—Gary Paumen
*Assistant Examiner*—Edwin A. Leon
(74) *Attorney, Agent, or Firm*—Michael Best & Friedrich LLP

(57) ABSTRACT

In a connector used for connecting a connection object which is movable in a first direction (A1), an insulator (11) has a main surface (13) spreading in the first direction and a second direction (A2) perpendicular thereto. Each of conductive contacts (31) is retained by the insulator and has a contact portion (37) protruding outward from the main surface of the insulator in a third direction (A3) perpendicular to the first and second directions. The contact portion is elastically supported by a spring portion so as to be movable toward the inside of the insulator in the third direction. Extended portions (37a) extend from the contact portion into the inside of the insulator, each extending in a direction crossing the first and third directions in a plane spreading in the first and third directions. Further, the insulator has guide surfaces (21a) for guiding movement of the extended portions in the third direction.

13 Claims, 7 Drawing Sheets

CONNECTOR IN WHICH MOVEMENT OF CONTACT PORTION OF CONTACT IS GUIDED BY INSULATOR

BACKGROUND OF THE INVENTION

This application claims priority to prior application JP 2002-94987, the disclosure of which is incorporated herein by reference.

The present invention relates to a connector used for connecting a connection object of a card type such as an IC card or a memory card.

A connector of the type includes an insulator having a main surface for receiving thereon the connection object, and conductive contacts retained by the insulator. Each contact has a contact portion protruding outward from the main surface of the insulator, and a spring portion elastically supporting the contact portion so as to be movable toward the inside of the insulator. In JP-A-2000-36349, for example, the contact portion has a spoon-like curved shape.

Following the movement along the main surface of the insulator, the connection object is brought into pressure contact with the contact portions of the contacts. When the connection object is set in a prescribed position on the main surface of the insulator, each contact portion is pushed by the connection object so as to be moved toward the inside of the insulator. When the connection object is removed from the prescribed position on the main surface of the insulator, each contact portion is pushed by the spring portion so as to be moved toward the outside of the insulator.

Upon moving along the main surface of the insulator, the connection object slides on the contact portions of the contacts. As a result, every time the connection object is set or removed, each contact portion receives an undesired external force in a direction along the main surface of the insulator. There is a possibility of deformation of the contact due to this undesired external force. When the contact deforms, the contact portion is displaced from a normal position over the main surface of the insulator, thereby to cause occurrence of connection failure with the connection object.

For preventing the displacement of the contact portion due to the undesired external force, the contact should be made of a relatively thick material and large in size. In this case, however, the reduction in size or thickness of the connector is restrained.

SUMMARY OF THE INVENTION

It is therefore an object of the present invention to provide a connector which has a less possibility of deformation of a contact upon setting or removing a connection object.

It is another object of the present invention to provide a connector of the type described, which can reduce the size or thickness of the connector.

Other objects of the present invention will become clear as the description proceeds.

According to an aspect of the present invention, there is provided a connector for use in connecting a connection object which is movable in a first direction. The connector comprises an insulator having a main surface for receiving thereon the connection object. The main surface spreads in the first direction and a second direction perpendicular to the first direction. The connector further comprises a conductive contact retained by the insulator. The contact comprises a contact portion protruding outward from the main surface of the insulator in a third direction perpendicular to the first and second directions, a spring portion elastically supporting the contact portion so as to be movable toward the inside of the insulator in the third direction, and an extended portion extending from the contact portion into the inside of the insulator in a direction crossing the first and third directions in a plane spreading in said first and third directions. The insulator has a guide surface for guiding movement of the extended portion in the third direction.

DESCRIPTION OF THE PREFERRED EMBODIMENTS

Figure 1:
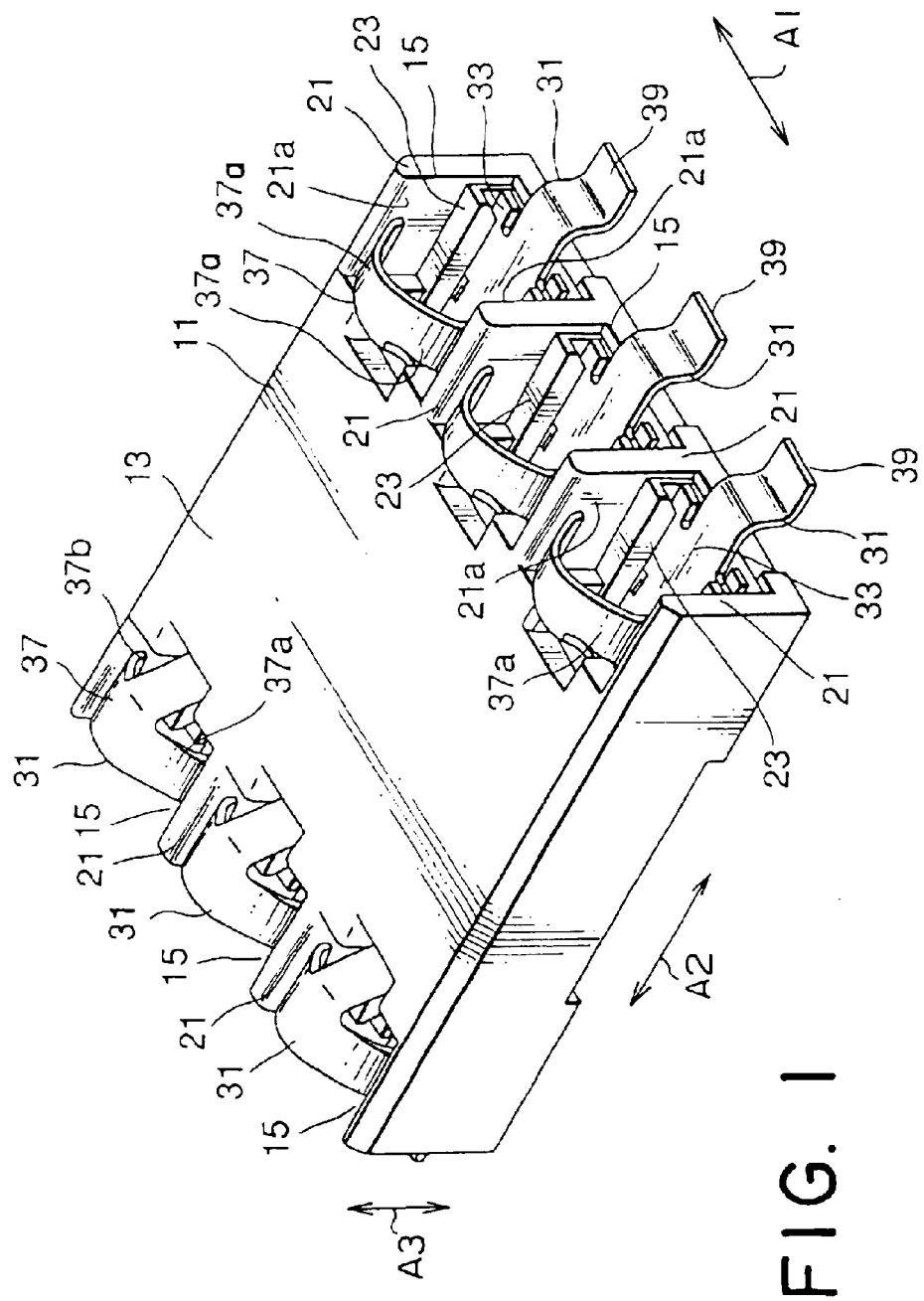
FIG. 1 is a perspective view of a connector according to a first preferred embodiment of the present invention.
Figure 2:
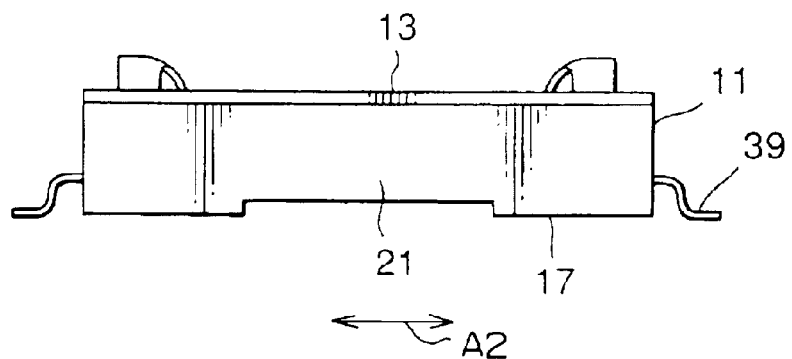
FIG. 2 is a front view of the connector shown in FIG. 1.
Figure 3:
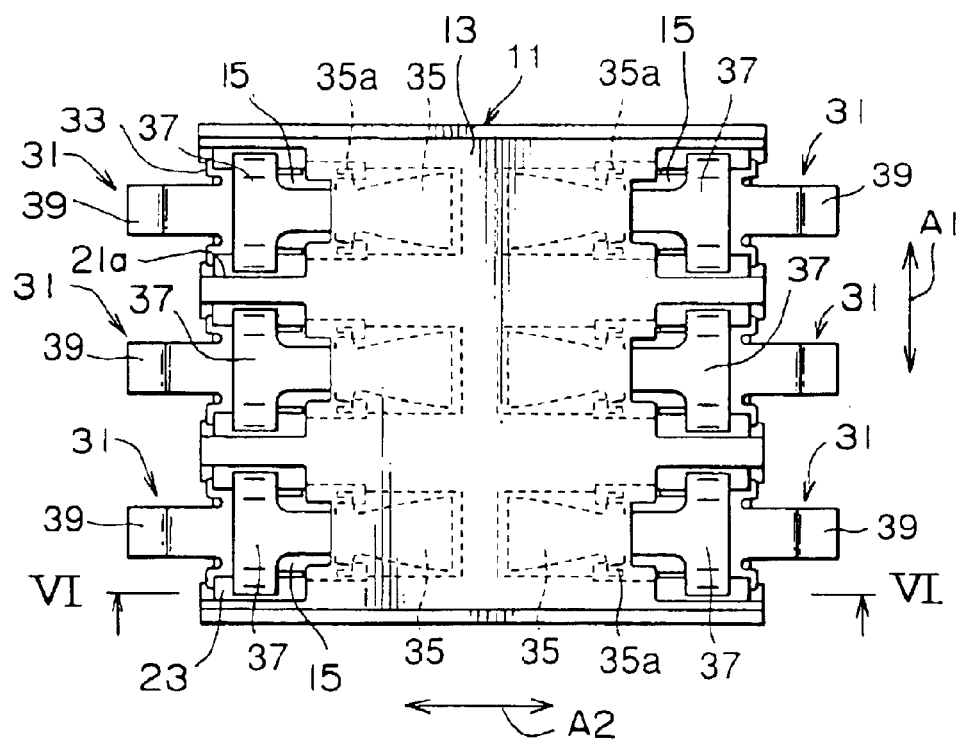
FIG. 3 is a plan view of the connector shown in FIG. 1.
Figure 4:
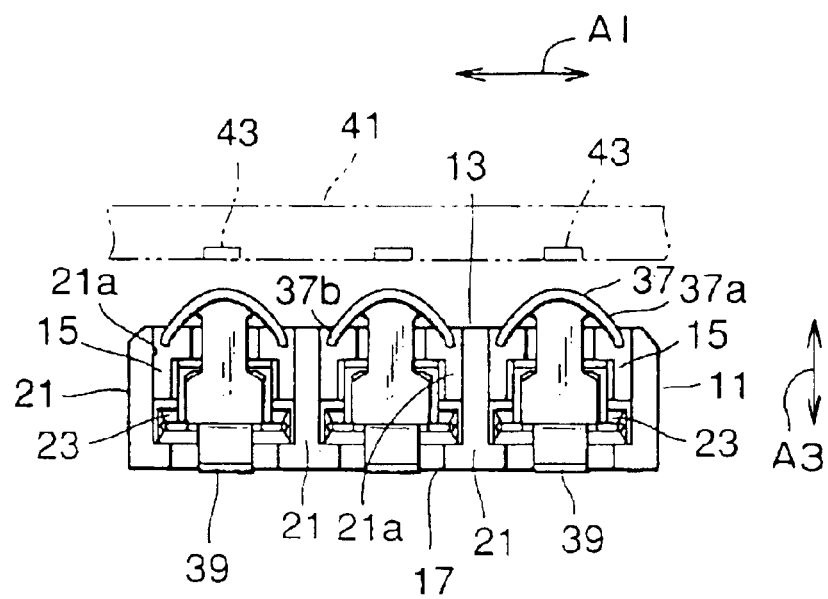
FIG. 4 is a right side view of the connector shown in FIG. 1.

Referring to FIGS. 1 to 4, the whole structure of a connector according to a first preferred embodiment of the present invention will be described.

This connector is used for connecting a connection object 41 of a card type having a flat plate-like appearance, such as an IC card or a memory card (hereinafter, the connection object will be referred to as "card"). The card 41 is moved in a first direction A1 upon connection or disconnection.

The shown connector comprises an insulator 11 having an approximately rectangular parallelepiped shape, and a plurality of conductive contacts 31 retained by the insulator 11. The insulator 11 has a main surface 13 formed at a center portion thereof in a longitudinal direction, i.e. a second direction A2. The main surface 13 spreads in the first and second directions A1 and A2.

The insulator 11 is formed at both end surfaces thereof in the second direction A2, with a plurality of groove portions 15 arranged in the first direction A1. The number of the groove portions 15 is three on each end side of the insulator 11 in the second direction A2. Each groove portion 15 is open to the main surface 13. In a surface of the insulator 11 on the side opposite to the main surface 13 are formed opening portions 19 respectively communicating with the groove portions 15.

The groove portions 15 are defined by a plurality of wall portions 21 of the insulator 11 each spreading in the second direction A2 and a third direction A3. Each wall portion 21 has a height from the side of a mounting surface 17 of the insulator to a level approximately the same as the main surface 13. On the side of the mounting surface 17 of the insulator 11 are formed retaining portions 23 each protruding inward in the groove portion 15 from the corresponding wall portions 21 for retaining the contact 31. Each wall portion 21 is formed with a guide surface 21a.

The number of the contacts 31 is six in total, which are received in the groove portions 15, respectively. On a surface confronting the main surface 13, the card 41 has contact portions 43 for contacting the contacts 31, respectively. When the card 41 is set in a prescribed position on the main surface 13, the contact portions 43 are brought into contact with the contacts 31 so that the card 41 is connected to the connector. An operation of setting the card 41 in the prescribed position on the main surface 13 or an operation of removing the card 41 from the prescribed position is carried out by moving the card 41 along the main surface 13 or in parallel with the main surface 13 in the first direction A1.

Figure 5:
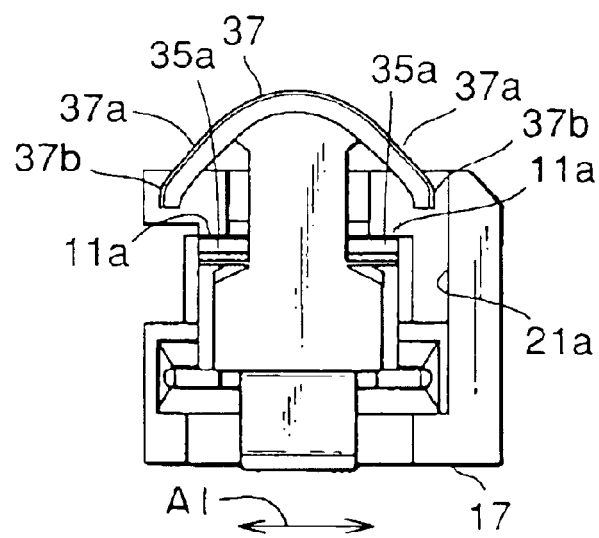
FIG. 5 is an enlarged right side view showing the main part of FIG. 4.
Figure 6:
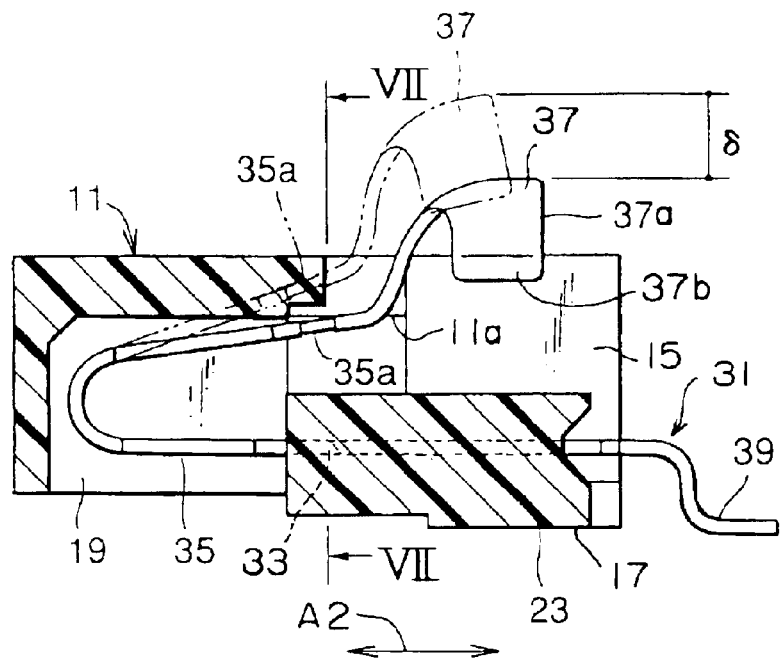
FIG. 6 is an enlarged sectional view of the main part, taken along line VI—VI of FIG. 3.
Figure 7:
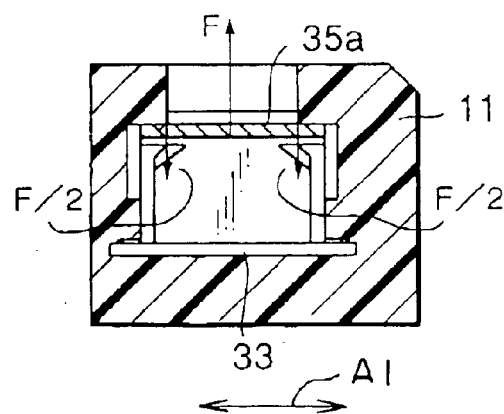
FIG. 7 is a sectional view taken along line VII—VII of FIG. 6.

Referring also to FIGS. 5 to 7, the contact 31 will be described.

The contact 31 comprises a retained portion 33 which is press-fitted into the retaining portion 23 of the insulator 11 so as to be retained thereby, a spring portion (a portion shown in FIG. 6 as having an approximately U-shape laid on its side) 35 extending from one end of the retained portion 33 and curved in a clip shape so as to be received in the groove portion 15, a contact portion 37 extending from an extended end of the spring portion 35 so as to elastically protrude outward from the main surface 13 of the insulator 11, and a terminal portion 39 extending from the other end of the retained portion 33 so as to protrude outward from the end surface of the insulator 11 in the second direction A2.

As best seen from FIG. 6, the contact portion 37 is formed so as to describe an approximately circular arc in a plane spreading in the second and third directions A2 and A3. On both sides of the contact portion 37 in the first direction A1 is formed a pair of extended or inviting portions 37a extend into the groove portion 15. One of the inviting portions 37a extends in a fourth direction crossing the first and third directions A1 and A3 in a particular plane spreading in the first and third directions A1 and A3. Another of the inviting portions 37a extends in a fifth direction crossing the first and third directions A1 and A3 and the fourth direction in the particular plane. A boundary portion between the contact portion 37 and each inviting portion 37a is formed as a gently curved surface.

Further, each inviting portion 37a is formed with a guided portion 37b spreading in the second and third directions A2 and A3. The guided portion 37b confronts the guide surface 21a of the wall portion 21 with a slight gap therebetween.

When the mounting surface 17 of the insulator 11 is mounted on a board such as a printed circuit board (not shown), the terminal portion 39 of each contact 31 is connected by soldering to a conductive portion (not shown) provided on the board.

At a portion, relatively near the contact portion 37, of the spring portion 35, a pair of broadened portions 35a are formed each broadened in the first direction A1. This is equivalent to a structure wherein projections are formed at both lateral ends of the spring portion 35 in a width direction thereof. On the other hand, the insulator 11 is formed with a pair of flat engaging portions 11a corresponding to each groove portion 15. Each of the engaging portions 11a is formed in a cut-out shape so as to engage the corresponding broadened portion 35a. Since the broadened portions 35a engage the engaging portions 11a in the state of the spring portion 35 being biased in advance, a preload is applied to the spring portion 35 of the contact 31.

The contact 31 can be produced by applying press blanking to a conductive plate, and then applying bending thereto.

In the state where the card 41 is not set on the main surface 13, the contact portion 37 of each contact 31 together with the inviting portions 37a protrude upward from the main surface 13 of the insulator 11. When the card 41 is moved along the main surface 13 of the insulator 11 in the first direction A1 for setting it in the prescribed position on the main surface 13, the card 41 contacts the inviting portion 37a and the contact portion 37 of each contact 31 and slides along the surfaces thereof. As a result, the contact 31 receives an undesired external force in the first direction A1. However, since the guided portion 37b abuts with the guide surface 21a so as to slide in the third direction A3, deformation of each contact 31 due to such an undesired external force is prevented.

Consequently, the card 41 is set in the prescribed position on the main surface 13 while pressing the contact portions 37 of the respective contacts 31 into the corresponding groove portions 15 of the insulator 11. In this manner, the contact portions 43 of the card 41 are brought into contact with the contact portions 37 of the contacts 31 in one-to-one correspondence. In this event, each contact portion 37 is put in pressure contact with the corresponding contact portion 43 owing to an urging force of the spring portion 35.

When removing the card 41 from the prescribed position, the card 41 also slides on the inviting portion 37a and the contact portion 37 of each contact 31. However, like in case of setting the card 41 as described above, the guided portion 37b abuts with the guide surface 21a so as to slide in the third direction A3, so that deformation of the contact 31 due to the undesired external force is prevented.

As described above, since there is provided the structure for preventing the deformation of each contact 31 that would be otherwise caused by the sliding movement of the card 41, no problem is raised in view of strength even if the contact 31 is made of a relatively thin material and small in size. Therefore, the reduction in size or thickness of the connector can be easily achieved.

A portion in the neighborhood of the contact portion 37 of the contact 31 is approximately T-shaped in a plan view. Accordingly, upon setting or removing the card 41, a displacement amount of the apex, in the third direction A3, of the contact portion 37 and a displacement amount of the tip, in the second direction A2, of the contact portion 37 become approximately equal to each other. Therefore, the increase in thickness of the connector can be avoided that would be otherwise necessitated by the fact that displacement amounts of the contact 31 partially differ.

The preload given to the spring portion 35 in advance corresponds to a displacement amount δ of the contact portion 37 upon attaching the contact 31 to the insulator 11. Since the pair of broadened portions 35a engage the pair of engaging portions 11a, respectively, the preload is received by the insulator 11 at two points in a dispersed manner. Namely, assuming that the preload is F, the insulator 11 is applied with dispersed loads each being F/2. Therefore, a possibility of deformation of the insulator 11 due to the preload is small.

Figure 8:
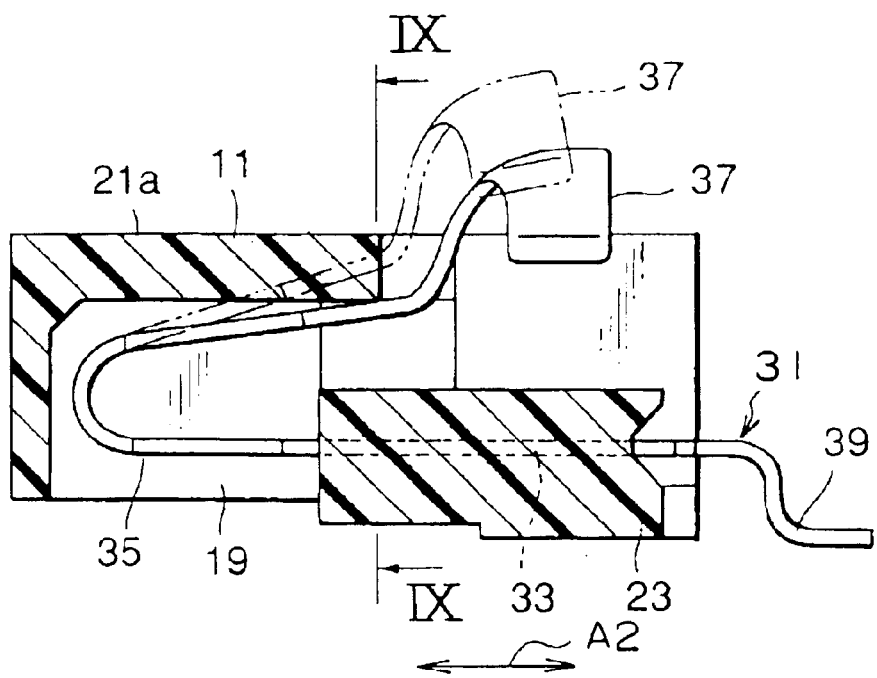
FIG. 8 is a sectional view similar to FIG. 6, of a connector according to a second preferred embodiment of the present invention.
Figure 9:
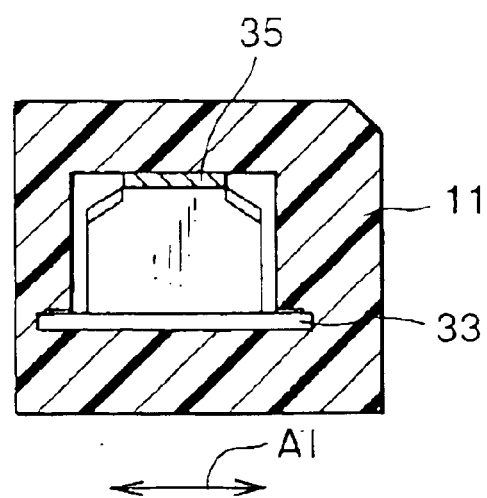
FIG. 9 is a sectional view taken along line IX—IX of FIG. 8.

Referring to FIGS. 8 and 9, the whole structure of a connector according to a second preferred embodiment of the present invention will be described. The same or like portions are assigned the same reference symbols, thereby to omit explanation thereof.

In this connector, as clear from FIG. 8, a contact portion 37 of a contact 31 is formed as a substantial end portion in the second direction A2. In the contact 31, a preload is applied to a spring portion 35 by engaging a portion between the spring portion 35 and the contact portion 37 with an upper wall portion 21a of the insulator 11.

According to this arrangement, both the insulator 11 and the contact 31 can be simplified in structure.

Figure 10:
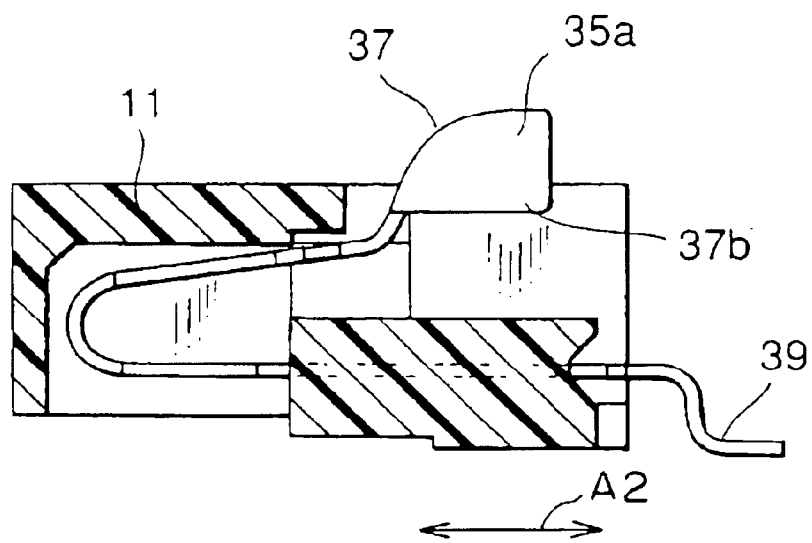
FIG. 10 is a sectional view similar to FIG. 6, of a connector according to a third preferred embodiment of the present invention.
Figure 11:
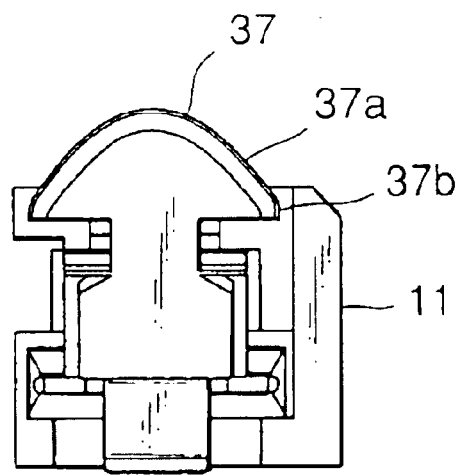
FIG. 11 is an enlarged right side view similar to FIG. 5, of the connector shown in FIG. 10.

Referring to FIGS. 10 and 11, the whole structure of a connector according to a third preferred embodiment of the present invention will be described. The same or like portions are assigned the same reference symbols, thereby to omit explanation thereof.

In this connector, as seen from FIG. 10, each inviting portion 37a and each guided portion 37b of a contact 31 extend longer in the second direction A2 as compared with FIGS. 6 and 8. Namely, the contact portion 37, the inviting portions 37a and the guided portions 37b cooperatively form a shape obtained by cutting half of a tip portion of a general spoon. By adopting this shape, the setting of the card 41 relative to the connector can be carried out more smoothly.

Figure 12:
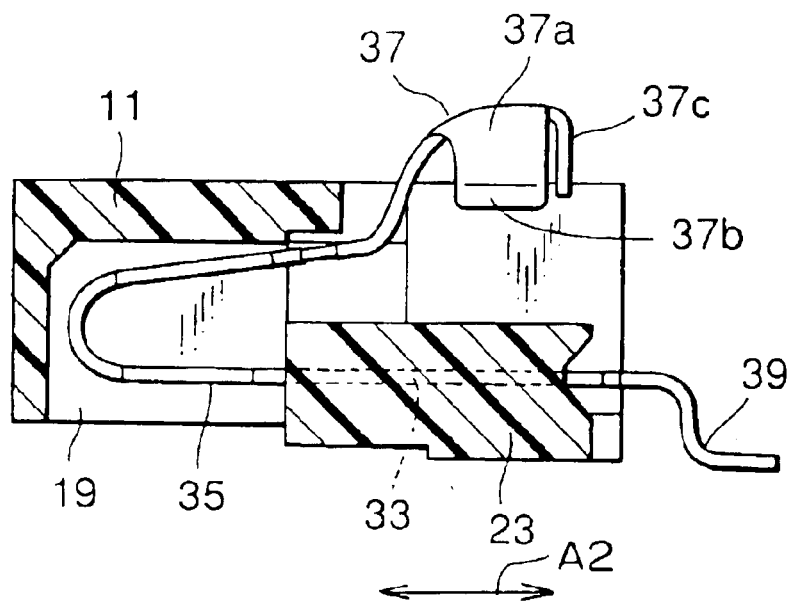
FIG. 12 is a sectional view similar to FIG. 6, of a connector according to a fourth preferred embodiment of the present invention.
Figure 13:
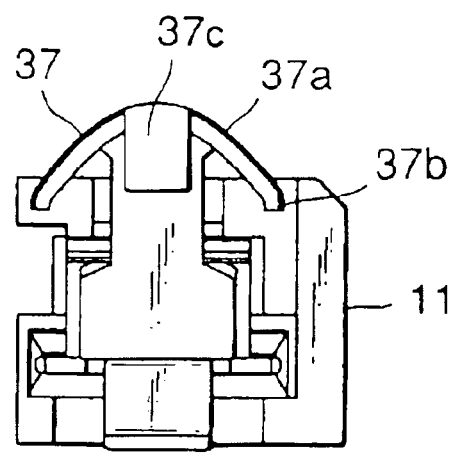
FIG. 13 is an enlarged right side view similar to FIG. 5, of the connector shown in FIG. 12.

Referring to FIGS. 12 and 13, the whole structure of a connector according to a fourth preferred embodiment of the present invention will be described. The same or like portions are assigned the same reference symbols, thereby to omit explanation thereof.

In this connector, an overhanging portion 37c is provided as an additional portion at the tip of a contact portion 37 of a contact 31. The overhanging portion 37c extends from the side of the apexes of inviting portions 37a toward the side of guided portions 37b. The overhanging portion 37c serves to prevent invasion of foreign matter into the inside of an insulator 11, i.e. into a groove portion 15.

While the present invention has thus far been described in connection with a few embodiments thereof, it will readily be possible for those skilled in the art to put this invention into practice in various other manners. For example, the inviting portion 37a is provided on each side of the contact portion 37 in the foregoing description, but may be provided only on one side thereof. The number of the groove portions 15 is changed according to the number of the contacts 31, and thus is not limited to the foregoing number.

What is claimed is:

1. A connector for use in connecting a connection object which is movable in a first direction, said connector comprising:

an insulator having a main surface for receiving thereon said connection object, said main surface spreading in said first direction and a second direction perpendicular to said first direction; and a plurality of conductive contacts retained by said insulator, each of said contact comprising:

a contact portion protruding outward from the main surface of said insulator in a third direction perpendicular to said first and second directions;

a spring portion having an approximately U-shape and elastically supporting said contact portion so as to be movable toward the inside of said insulator in said third direction; and an extended portion extending from said contact portion into the inside of said insulator in a fourth direction crossing said first and third directions in a plane spreading in said first and third directions, said insulator having a guide surface for guiding movement of said extended portion in said third direction a combination of said contact portion, said spring portion, and said extended portion having an approximately T-shape, said conductive contacts being arranged in two rows to make said contact portion and said extended portion be placed outer than said spring portion relative to said insulator.

2. A connector as claimed as claim 1, wherein said extended portion spreads in said second direction.

3. A connector as claimed as claim 1, wherein said extended portion has a guided portion confronting said guide surface and extending in said third direction.

4. A connector as claimed as claim 3, wherein said extended portion spreads in said second direction.

5. A connector as claimed as claim 1, wherein said spring portion is joined to one end of said contact portion in said second direction, said contact having an additional portion extending from the other end of said contact portion in said second direction toward the inside of said insulator.

6. A connector as claimed as claim 5, wherein said additional portion spreads in said first direction.

7. A connector as claimed as claim 1, wherein said contact engages said insulator while said spring portion is biased in advance.

8. A connector as claimed as claim 7, wherein said insulator has an engaging portion, said contact having a broadened portion engaging said engaging portion.

9. A connector as claimed as claim 8, wherein said broadened portion protrudes from said spring portion in said first direction.

10. A connector as claimed as claim 1, wherein said insulator has a groove portion opening to said main surface and a surface adjacent to said main surface in said second direction, said contact being attached to said groove portion.

11. A connector as claimed as claim 10, wherein said insulator has a plurality of wall portions defining said groove portion, each of said wall portions spreading in said second and third directions and is formed with said guide surface.

12. A connector as claimed as claim 10, wherein said insulator has an opening portion for causing said groove portion to be open to a surface of said insulator on a side opposite to said main surface.

13. A connector as claimed as claim 12, wherein said insulator has a retaining portion adjacent to said opening portion in said second direction, said contact being retained by said retaining portion.

* * * * *